United States Patent
Wang (10) Patent No.: US 7,252,438 B2
(45) Date of Patent: Aug. 7, 2007

(54) OPTICAL FIBER COUPLING ASSEMBLY

(76) Inventor: Chong-Nien Wang, 3F., No. 12, Lane 13, Chi Hsiang St., Hsin Tien City, Taipei Hsien (TW)

( * ) Notice: Subject to any disclaimer, the term of this patent is extended or adjusted under 35 U.S.C. 154(b) by 6 days.

(21) Appl. No.: 11/362,096

(22) Filed: Feb. 27, 2006

(65) Prior Publication Data

US 2006/0263010 A1    Nov. 23, 2006

Related U.S. Application Data

(63) Continuation-in-part of application No. 11/135,423, filed on May 23, 2005, now Pat. No. 7,036,996.

(51) Int. Cl.
*G02B 6/38* (2006.01)
(52) U.S. Cl. .............................. 385/55; 385/70; 385/59; 385/62
(58) Field of Classification Search ................ None
See application file for complete search history.

(56) References Cited

U.S. PATENT DOCUMENTS 5,359,688 A * 10/1994 Underwood ................. 385/70
5,719,977 A * 2/1998 Lampert et al. ............. 385/60
7,036,996 B1 * 5/2006 Wang .......................... 385/55

* cited by examiner

*Primary Examiner*—Rodney Bovernick
*Assistant Examiner*—Omar Rojas
(74) *Attorney, Agent, or Firm*—Leong C. Lei (57) ABSTRACT

An optical fiber coupling assembly is provided herein for the coupling of at least a pair of fiber cables. A connector is installed to an end of a fiber cable. The connector is then inserted into a through channel of a coupler. A spring-loaded latch inside the through channel is used to force the cores of the fiber cables to be tightly joined together, reducing the power loss of the light signal transmission over the pair of coupled fiber cables. The coupling assembly is structurally simple, has a smaller form factor, and is able to increase installation efficiency and reduce production cost.

2 Claims, 7 Drawing Sheets

OPTICAL FIBER COUPLING ASSEMBLY

This is a continuation-in-part of U.S. application Ser. No. 11/135,423, now U.S. Pat. No. 7,036,996, filed May 23, 2005.

BACKGROUND OF THE INVENTION (a) Technical Field of the Invention

The present invention generally relates to optical fibers, and more particularly to a coupling assembly comprising coupler and connectors for tight joining of the cores of fiber cables.

(b) Description of the Prior Art

The introduction of fiber optics has dramatically changed how telecommunications is conducted. Using lights as carriers and fiber cables to deliver light signals precisely and accurately, fiber optics provides signal transmissions far superior than conventional means and, therefore, relevant industries have emerged around the field of fiber optics.

In real-life applications, it is often required to join two fiber cables together using passive devices such as couplers. An ideal coupler should be able to provide low power loss, reliability in terms of frequent connection and disconnection, durability under harsh environment, and easy installation. Currently, a common fiber coupler establishes physical contact between two fiber cables by receiving the connectors installed at the ends of the fiber cables into the through channels inside the coupler. Usually a spring or other similar device inside the coupler exerts pressure on the connectors so that the cores of the fiber cables are in close contact with each other, and light signals could thereby be transmitted from one fiber cable to another.

For example, both the U.S. Pat. No. 5,359,688 and Republic of China, Taiwan, Patent No. 302,441 discloses different connector and coupler designs for joining a single pair of fiber cables. The connectors according to these teachings contain multiple components arranged in a complicated structure. Therefore, not only the installation of the connectors becomes troublesome, but also the coupler requires a larger form factor so as to accommodate the more complicated connectors. In user environments where facility space is tight, the bulky couplers would provide only a limited number of cable couplings.

U.S. Pat. No. 5,719,977 therefore discloses a design which achieves a coupler having a smaller form factor by utilizing specially-shaped connectors. Compared with conventional connectors and couplers, the design is able to provide an additional pair of fiber cable coupling within a compatible dimension. The space saving of the teaching, however, is compromised by the additional requirement of increased precision in the production of reduced-sized components. For example, the diameter of the connector's tubular plug is reduced from the conventional 2.5 mm to 1.25 mm, making the manufacturing process much more difficult and, therefore, increasing the production cost dramatically.

Accordingly, an improved design is required so as to strike a balance between the requirements for scaling down the component sizes and for reducing operation difficulty and production cost.

SUMMARY OF THE INVENTION

The primary purpose of the present invention is to provide an assembly for fiber cable coupling, which utilizes structurally simple and easy-to-assembly connectors and coupler. The coupler is able to join fiber cables whose connectors have conventional 2.5 mm tubular plugs within the conventional form factor, thereby achieving the size reduction for the coupler while reducing the production cost of both the coupler and connectors.

To achieve the foregoing purpose, the coupling assembly provided by the present invention contains structurally simple connectors and coupler. The coupler is formed by joining two identical body members. A crimp ring fixedly install the connector body to an end of a fiber cable. A tubular plug of the connector body is fit inside a sleeve or through channel of the coupler. A spring-loaded latch exerts pressure on the connector body so that the cores of the fiber cables are tightly joined together, providing effective and lossless light signal transmission over the two fiber cables. The coupling assembly of the present invention is able to provide coupling for an additional pair of fiber cables within the same form factor as conventional couplers. Due to its simplicity, the coupling assembly of the present invention could further reduce production cost and increase installation efficiency.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
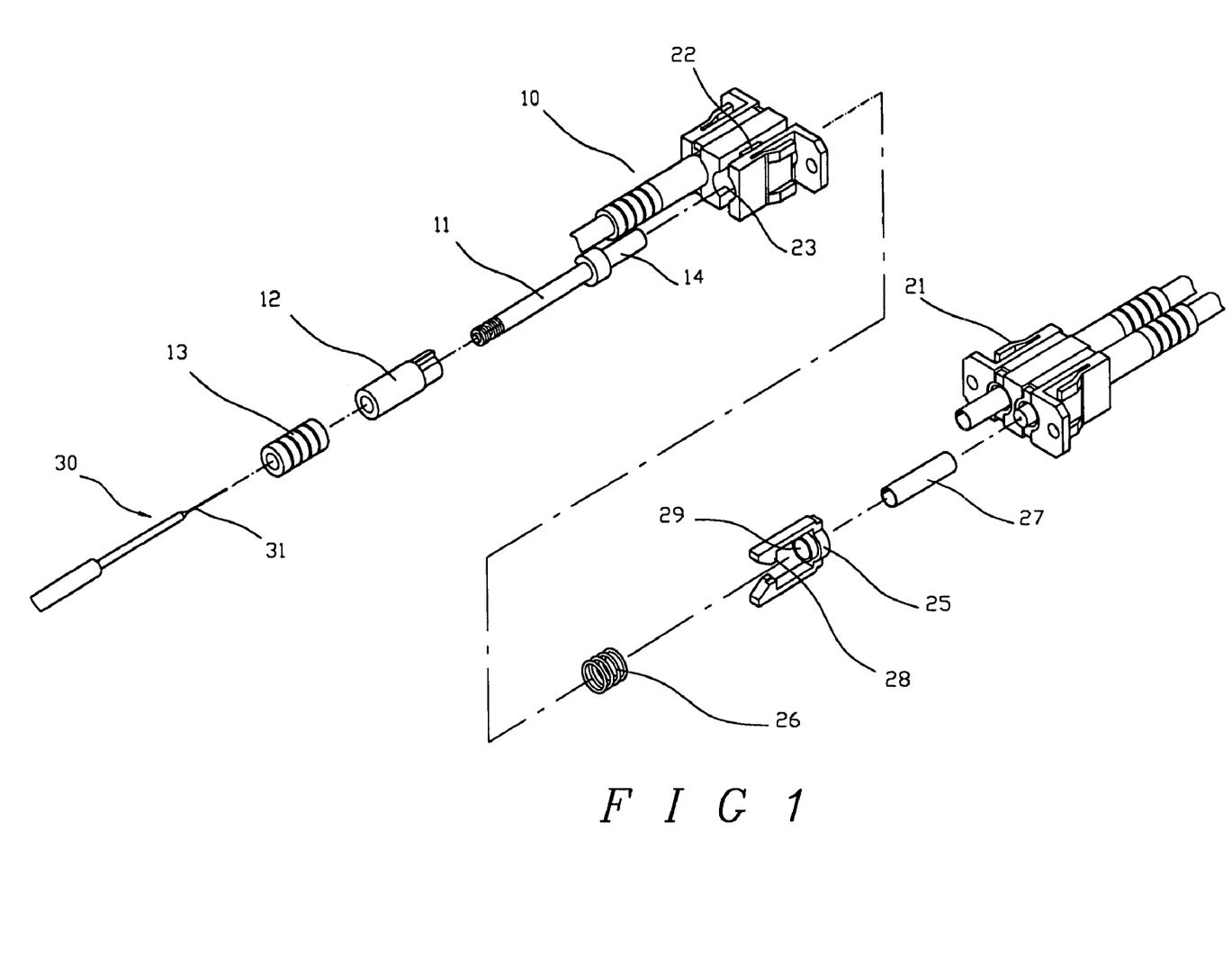
FIG. 1 is a perspective exploded view showing the coupling assembly according to an embodiment of the present invention.
Figure 2:
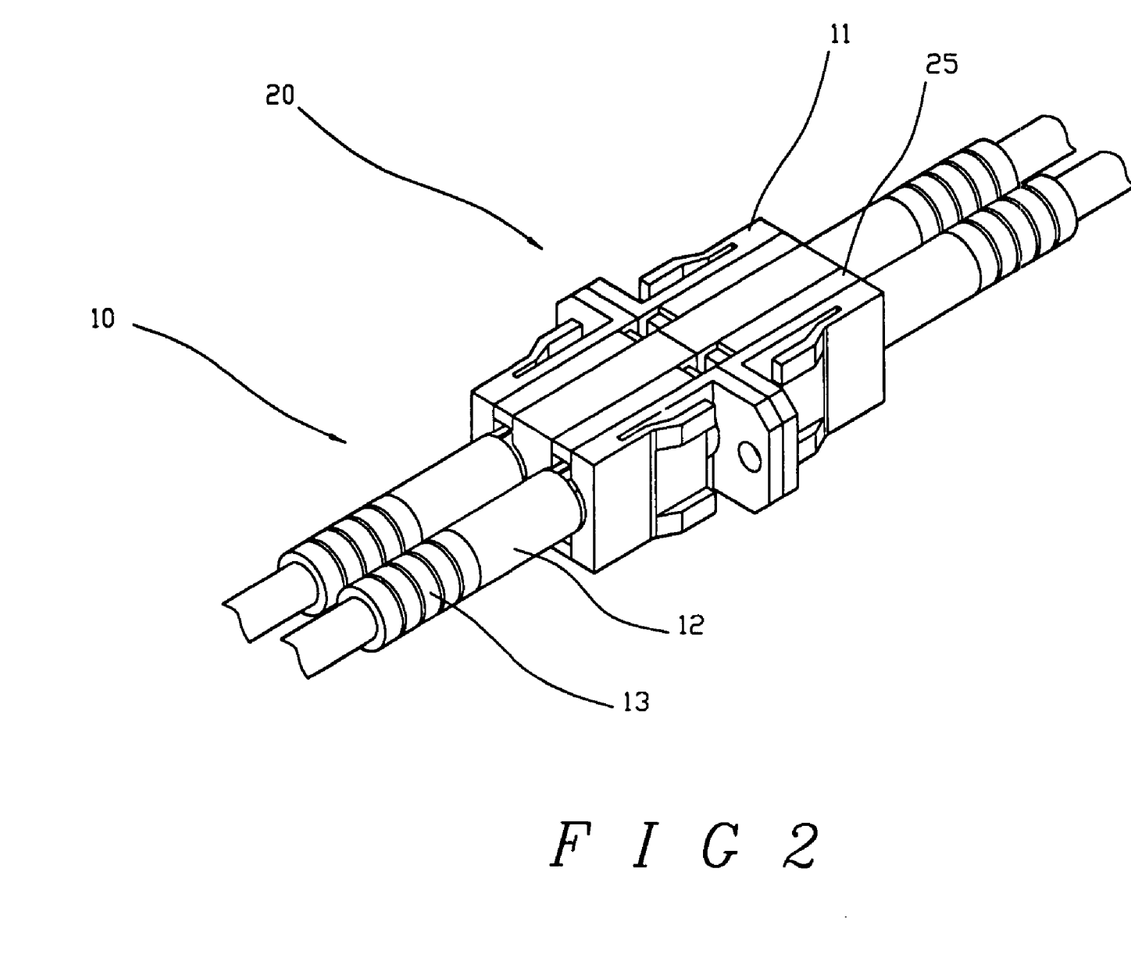
FIG. 2 is a perspective view showing two pairs of fiber cables coupled by the coupling assembly of FIG. 1.
Figure 3:
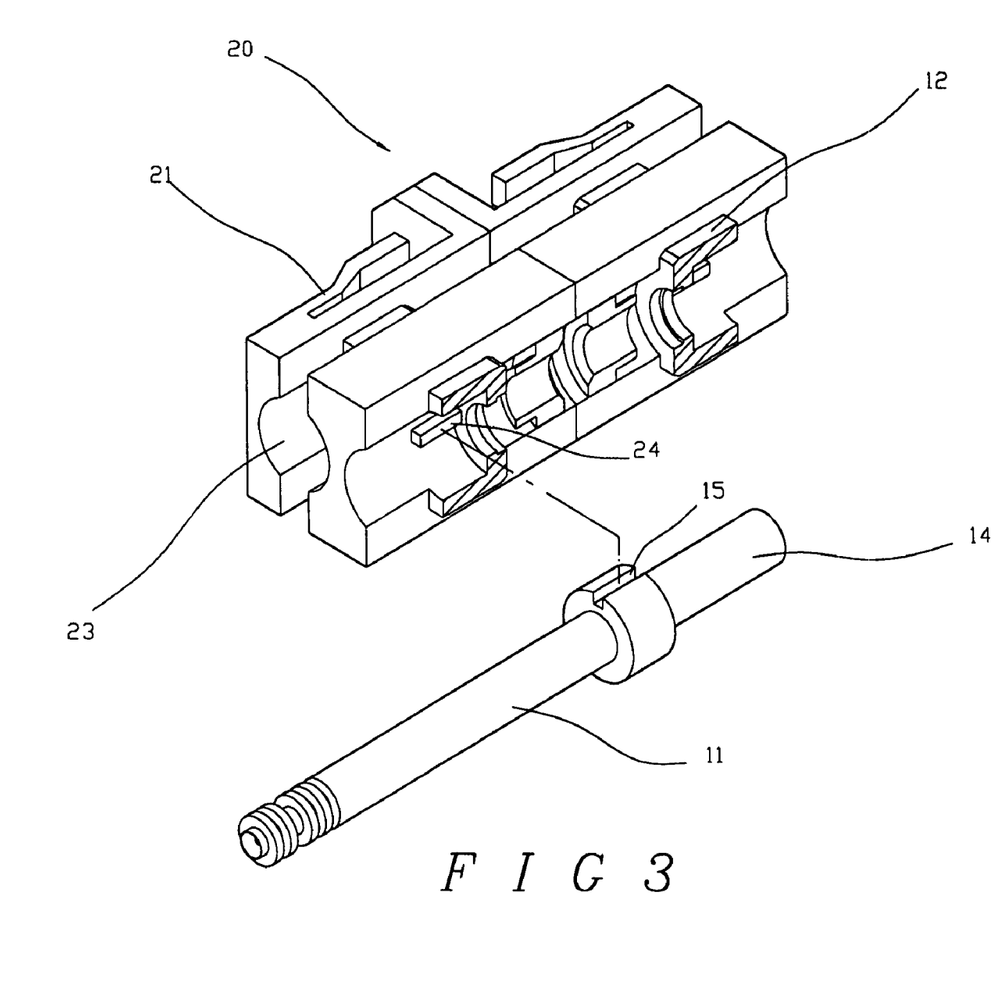
FIG. 3 is a perspective view showing the interaction of the coupler and the connector of the coupling assembly of FIG. 1.

As illustrated in FIGS. 1 to 3, an embodiment of the optical fiber coupling assembly according to the present invention mainly contains optical fiber connectors 10 and a coupler 20.

The connector 10 has a tubular body member 11 with a tubular plug 14 at an end (hereinafter, the back end), which has the other end (hereinafter, the front end) threaded through and extended out of a tubular segment 12. At the back end of the tubular segment 12, there is an arc indentation (not numbered) on the cylindrical outside wall of the tubular segment 12 in front of said tubular plug 14. The emerged section of the body member 11 is then threaded through a crimp ring 13 and pierces into the cladding layer (not numbered) and the sheath layer (not numbered) of a fiber cable 30. The crimp ring 13 is used to fixedly clip the fiber cable 30 and the tubular body 11 together, and to achieve an appropriate tension between the fiber cable 30 and the connector 10. Please note that the core 31 of the fiber cable 30 is exposed for an appropriate length so that it is extended out of the tubular plug 14 of the body member 11. The extraneous fiber core 31 outside the tubular plug 14 is cut and removed. The fiber core 31 is then abraded so that its end surface is flush against the tubular plug 14's back end. At this point, the installation of the connector 10 to the fiber cable 30 is completed. Please note that, on the cylindrical outside wall of the tubular plug 14 as shown in FIG. 3, there is a groove 15 along the axial direction of the connector 10 for preventing the connector 10 from rotation inside the coupler 20. In contrast to the conventional connectors having springs and other component inside and therefore having higher production cost and fiber cable installation difficulty, the connector 10 of the present invention is significantly simplified and cost-downed.

The coupler 20 is assembled by joining a pair of corresponding body members 21. Each body member 21 has a pair of parallel, circular through channels 23 for receiving the tubular plugs 14 of two fiber cables 30's connectors 10. The through channels 23 of the body members 21 are properly aligned so that, when the body members 21 are attached together, their through channels 23 are joined to form a pair of through ducts (not numbered) from one end of the coupler 20 to the other end. Each of the through channels 23 is configured such that, from a cross-sectional point of view, the through channel 23 is similar to being formed by two semi-circular pieces joined together by a pair of radially aligned connection blocks 22. At an appropriate location on the circular wall of each through channel 23, there is a positioning block 24. The positioning block 24 is configured correspondingly to the groove 15 of the tubular plug 14 so that, when a fiber cable 30 is inserted into the coupler 20, the positioning block 24 is received by the groove 15 and the connector 10 is prevented from rotating inside the coupler 20 and causing light power loss resulted from the misconnection and inappropriate wearing at the interface of the two connected fiber cables 30.

A tubular segment 27 is positioned inside each of the through ducts and is extended from one through channel 23 to the other. The dimension of the tubular segment 27 is configured such that the tubular plug 14 can be fitted inside perfectly. A C-shaped latch 25 having two parallel hooks 28 and a helix spring 26 positioned between the two hooks 28 are sleeved over an end of the tubular segment 27 via a hole 29 of the latch 25. Each end of the tubular segment 27, along with the latch 25 and the spring 26 at that end, is inserted into the back end of a through channel 23 of a body member 21 until the hooks 28 pass over and locks on the connection blocks 22, causing the spring 26 slightly compressed by the connection blocks 22.

Figure 4:
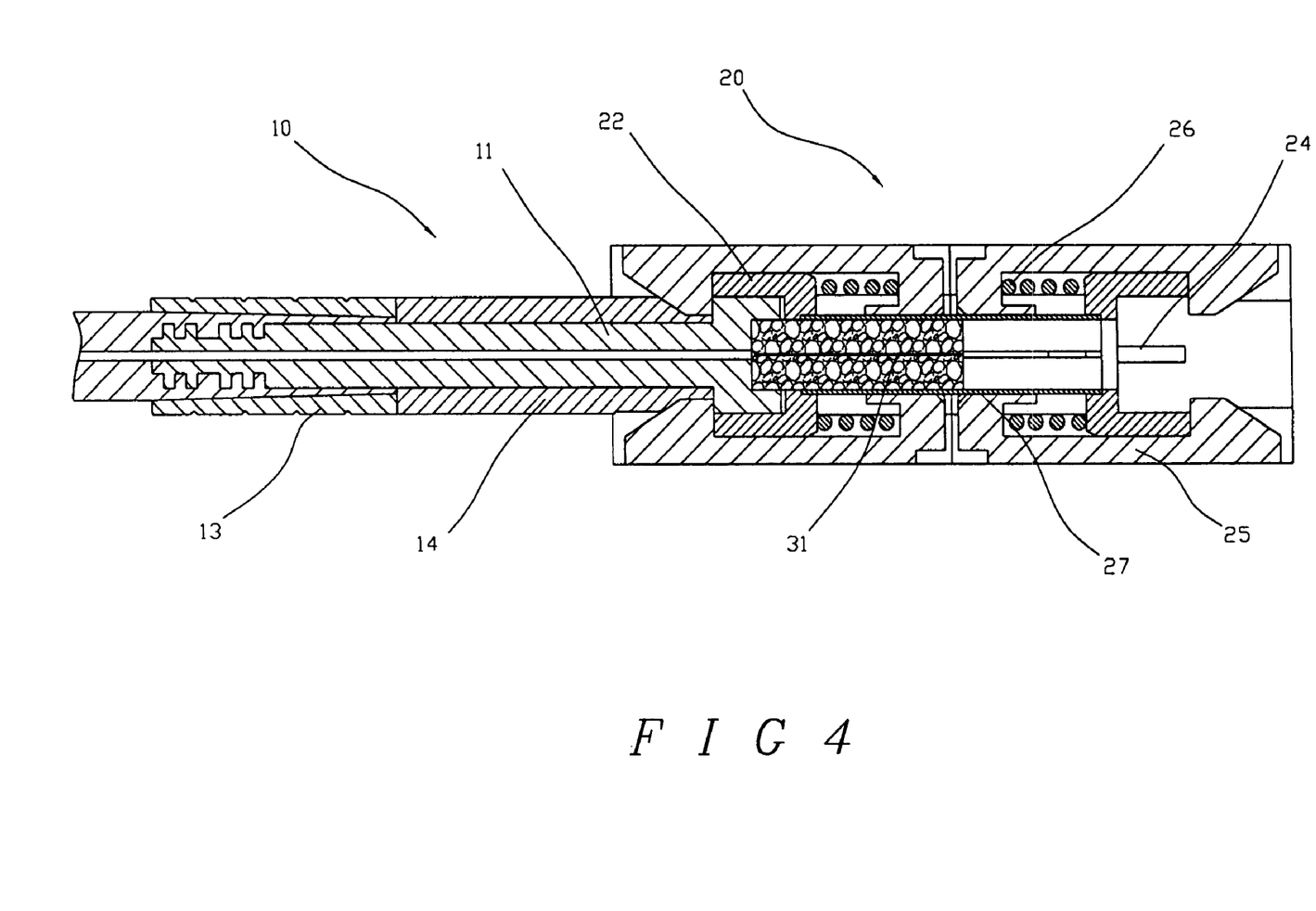
FIG. 4 is a sectional view showing a fiber cable is plugged into the coupler of the coupling assembly of FIG. 1.
Figure 5:
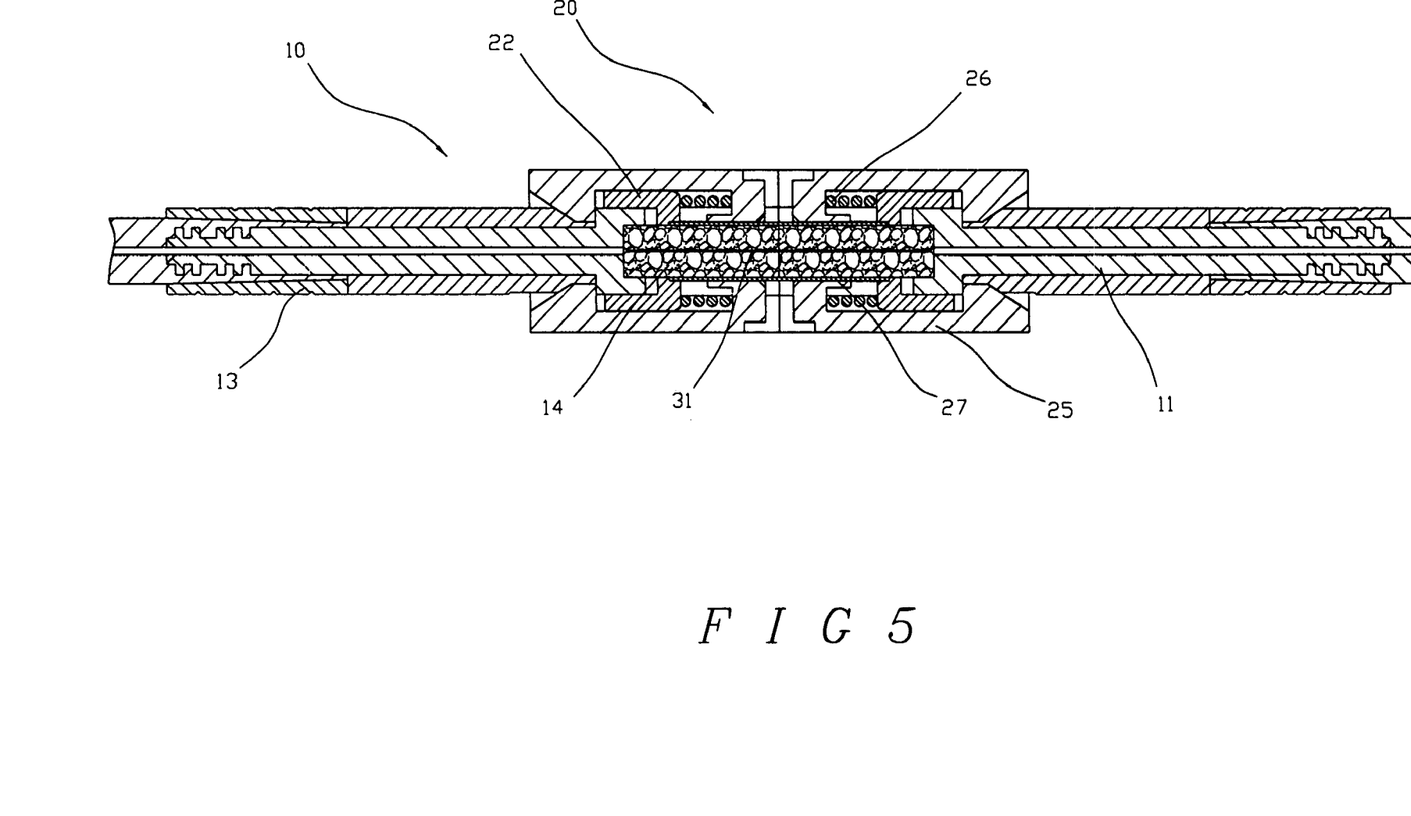
FIG. 5 is a sectional view showing another fiber cable is plugged into the coupler of the coupling assembly of FIG. 4.
Figure 6:
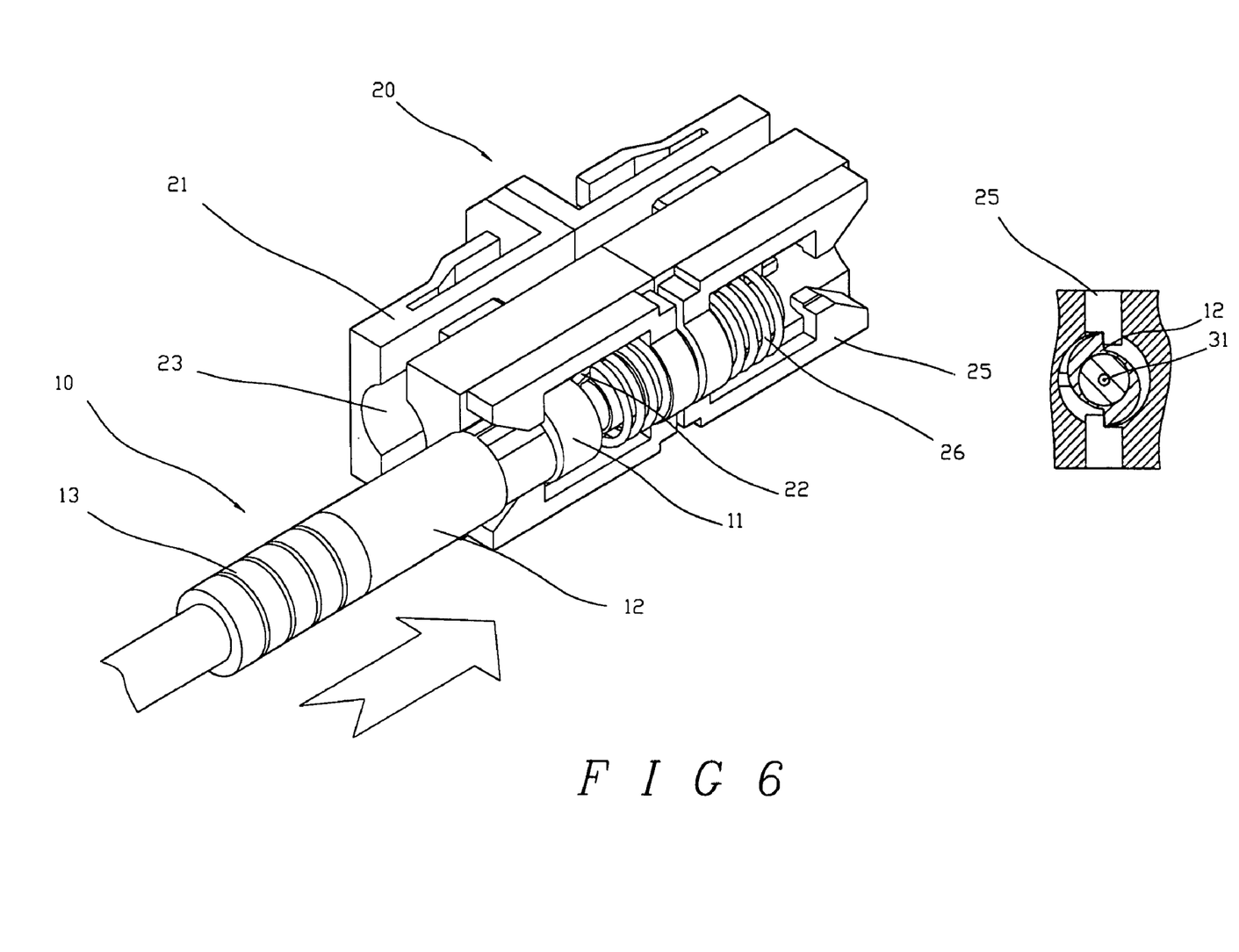
FIG. 6 is a perspective view showing a fiber cable is plugged into the coupler of the coupling assembly of FIG. 1.

As shown in FIGS. 4 and 5, to use the coupling assembly of the present embodiment, the connector 10 of a first fiber cable 30 is inserted into the front end of a through channel 23 of a first body member 21 of the coupler 20 by aligning the positioning block 24 and the groove 15. As the tubular plug 14 enters the through channel 23, the hooks 28 are pushed apart and, as the tubular plug 14 is inserted further, the hooks 28 embed into the arc indentation along the outside wall of the tubular segment 12 of the connector 10, as shown in FIG. 6. The tubular plug 14 can go all the way through the through channel 23 and extends into a second body member 21 of the coupler 20. When a second fiber cable 30 is inserted into the corresponding through channel 23 of the second body member 21, the second fiber cable 30 will force the first fiber cable 30 backward and compress the spring 26 of the first body member 21. Correspondingly, the second cable 30 and the spring 26 of the second body member 21 will suffer an equal amount of counterforce. As the two body members 21 are configured identically, when the resilient force of the two springs 26 reach an equilibrium state, the cores 31 of the first and second fiber cables 30 would be tightly joined together.

Figure 7A:
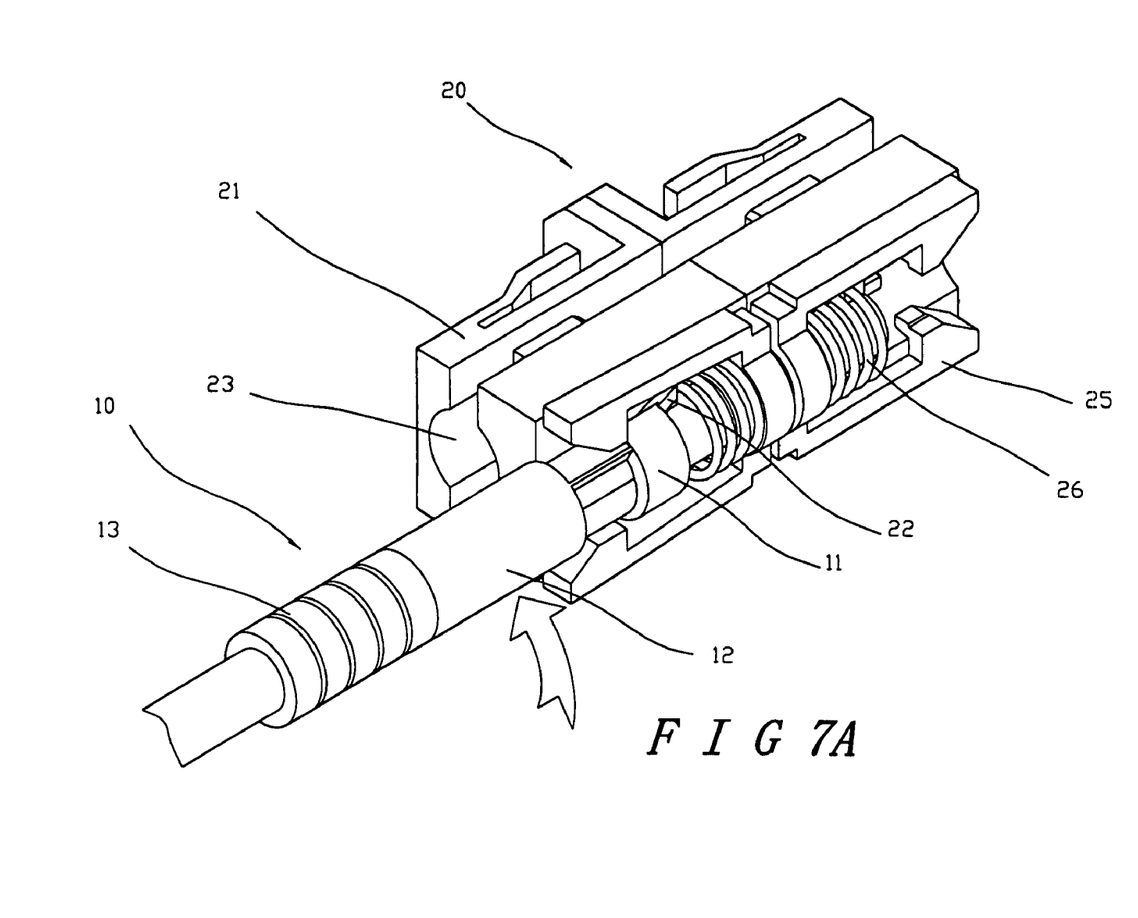
FIGS. 7A & 7B is a perspective view showing a fiber cable is unplugged from the coupler of the coupling assembly of FIG. 1.
Figure 7B:
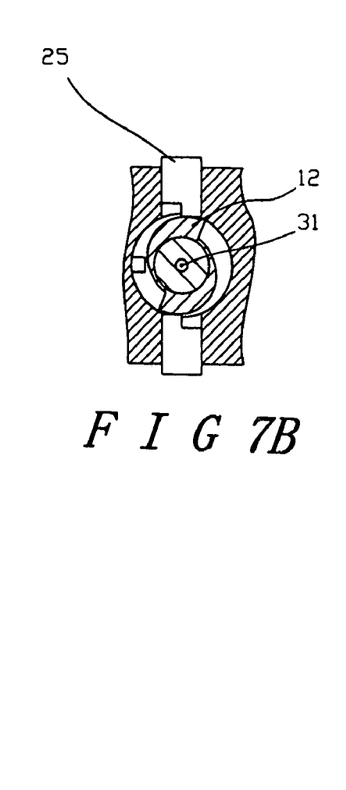

To unplug a fiber cable 30, the tubular segment 12 is twisted until the hooks 28 are pushed apart as they are forced out of the arc indentation as shown in FIGS. 7A & 7B. Then, the fiber cable 30 can be pulled out of the coupler 20 manually or ejected by the resilient force of the spring 26.

Due to the simplified structure of the connectors 10 and the coupler 20, the present embodiment is able to provide coupling for an additional pair of fiber cables 30 within the same form factor as the conventional couplers. In addition, the tubular plug 14 of the body member 11 has an ordinary diameter and, therefore, requires no special treatment and parts and hence less production cost. Furthermore, the reduced number of components and convenience of operation also further contribute to enhanced installation efficiency.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An optical fiber coupling assembly for joining at least a pair of a first fiber cable and a second fiber cable, comprising:

at least two connectors, each of which is configured on an end of said first and second fiber cables respectively, each of said connectors having a tubular body member with a tubular plug at a back end, a crimp ring, and a tubular segment, said body member having its front end threaded through said tubular segment and said crimp ring and piercing into a cladding layer and a sheath layer of said first or second fiber cable, said crimp ring fixedly clipping said body member and said first or second fiber cable together, said tubular segment having an arc indentation on the outside wall at the back end of said tubular segment; and a coupler assembled by two corresponding body members, a tubular segment, two springs, and two C-shaped latches, each body member having at least a through channel, said through channels of said body members being aligned to form a through duct through said coupler, each body member having at least a connection block around the circumference of said through channel, each of said C-shaped latches having a pair of hooks and each of said springs being positioned between said hooks, said tubular segment being threaded through said latches and said springs, each end of said tubular segment, along with said latch and said spring at that end, being inserted into the back end of a through channel of said body members until said hooks pass over and locks on said connection blocks;

wherein, when said connectors are inserted into said through channels of said coupler; said tubular plugs push said hooks apart and, as said tubular plugs are inserted further, said hooks embed into said arc indentations of said tubular segments of said connectors.

2. The optical fiber coupling assembly according to claim 1, wherein said tubular plug of said connector has a groove along the axial direction on the outside wall of said tubular plug for receiving a positioning block at an appropriate location on the circular wall of said through channel when said tubular plug is plugged into said through channel to prevent said connector from rotating inside said through channel.

* * * * *